United States Patent
Fang et al.

(10) Patent No.: US 6,970,615 B1
(45) Date of Patent: Nov. 29, 2005

(54) COMPACT HIGH-STABILITY OPTICAL SWITCHES

(75) Inventors: Zuyun Fang, Henderson, NV (US); Siyu Shen, San Leandro, CA (US); Jianhua Wang, Saratoga, CA (US)

(73) Assignee: Optiworks, Inc., Fremont, CA (US)

(*) Notice: Subject to any disclaimer, the term of this patent is extended or adjusted under 35 U.S.C. 154(b) by 0 days.

(21) Appl. No.: 10/802,126

(22) Filed: Mar. 16, 2004

(51) Int. Cl.[7] .............................................. G02B 6/26
(52) U.S. Cl. ........................ 385/16; 385/18; 385/25; 385/50
(58) Field of Search ........................... 385/16, 18, 20, 385/15, 17, 25, 39, 50

(56) References Cited

U.S. PATENT DOCUMENTS

| | | | |
|---|---|---|---|
| 5,048,912 A * | 9/1991 | Kunikane et al. | 385/23 |
| 5,867,617 A * | 2/1999 | Pan et al. | 385/18 |
| 5,875,271 A * | 2/1999 | Laughlin | 385/16 |
| 5,999,669 A | 12/1999 | Pan et al. | 385/18 |
| 6,647,173 B2 * | 11/2003 | Chen et al. | 385/18 |
| 2003/0081885 A1 * | 5/2003 | Chen et al. | 385/18 |
| 2003/0095742 A1 * | 5/2003 | Zhou | 385/22 |

* cited by examiner

Primary Examiner—Kaveh Kianni
(74) Attorney, Agent, or Firm—Andrei D. Popovici

(57) ABSTRACT

In one embodiment, an optical switch includes: a first dual-fiber collimator comprising a first pair of optical fibers; a second fiber collimator comprising an output optical fiber; a switching prism movable between a first position and a second position, and a first mirror facing the first collimator. In the first position, the switching prism directs light from an input fiber of the first collimator into the output fiber of the second collimator. In the second position, the switching prism is positioned out of an optical path of light emitted from the input fiber of the first collimator. The first mirror is aligned to reflect light from the input fiber of the first collimator into an output fiber of the first collimator when the switching prism is in the second position. The second collimator may be a dual-fiber collimator, and a second mirror may be placed facing the second collimator.

20 Claims, 6 Drawing Sheets

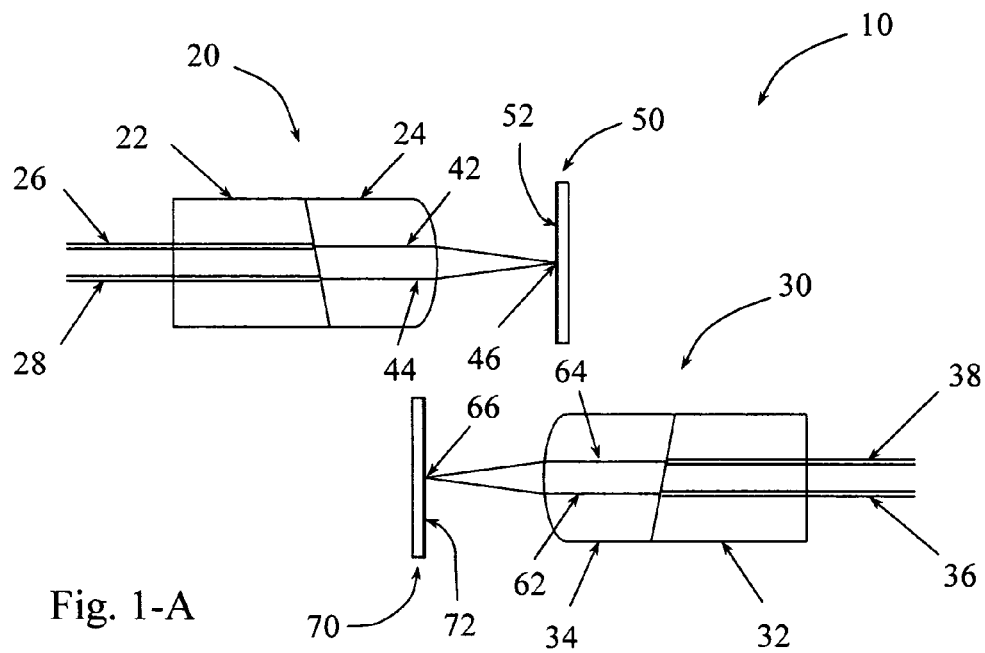
Fig. 1-A
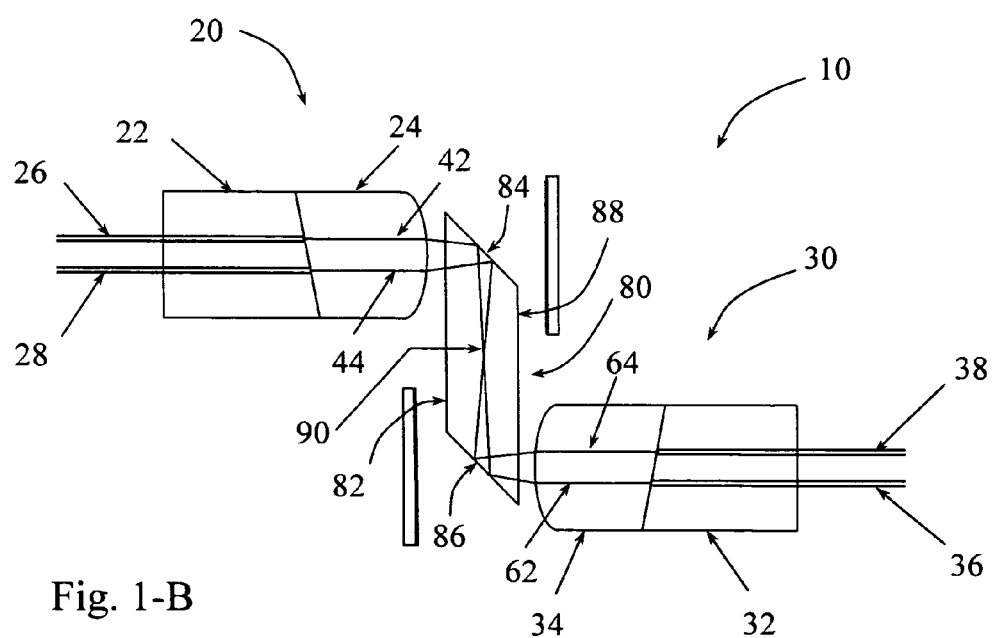
Fig. 1-B

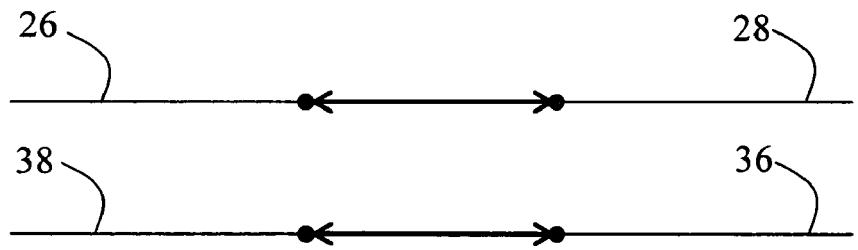
Fig. 2-A
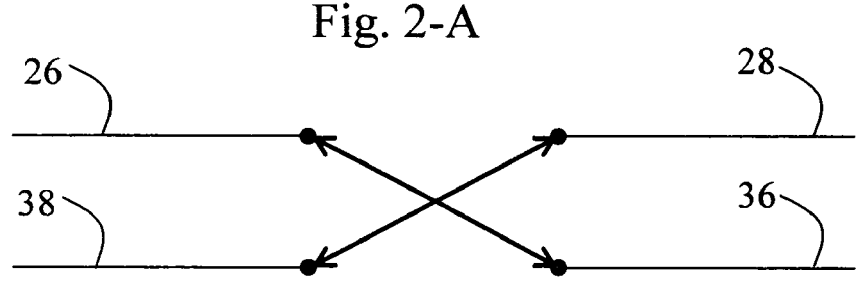
Fig. 2-B
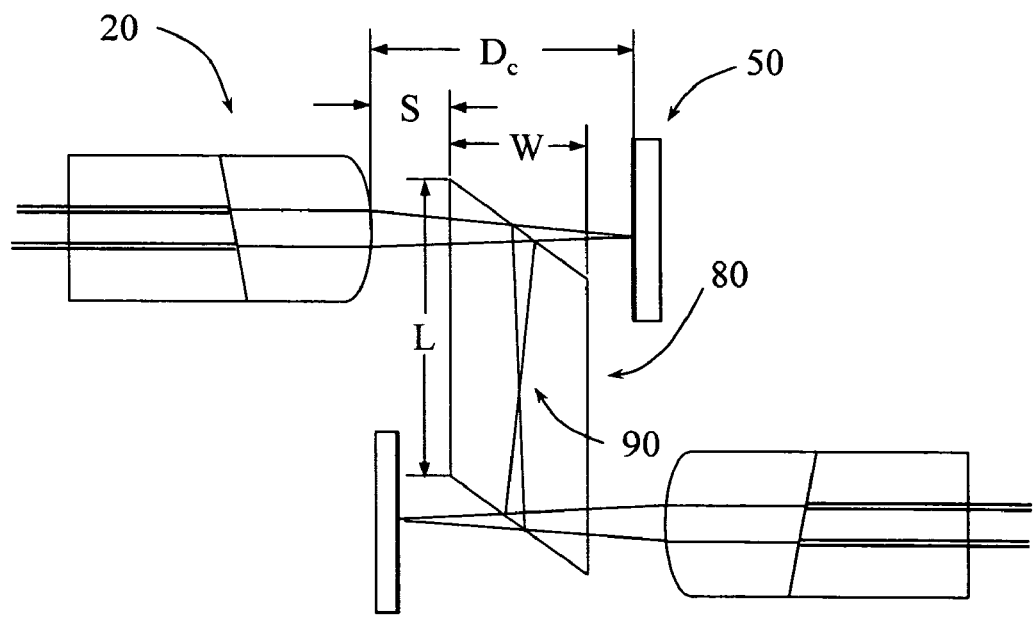
Fig. 3

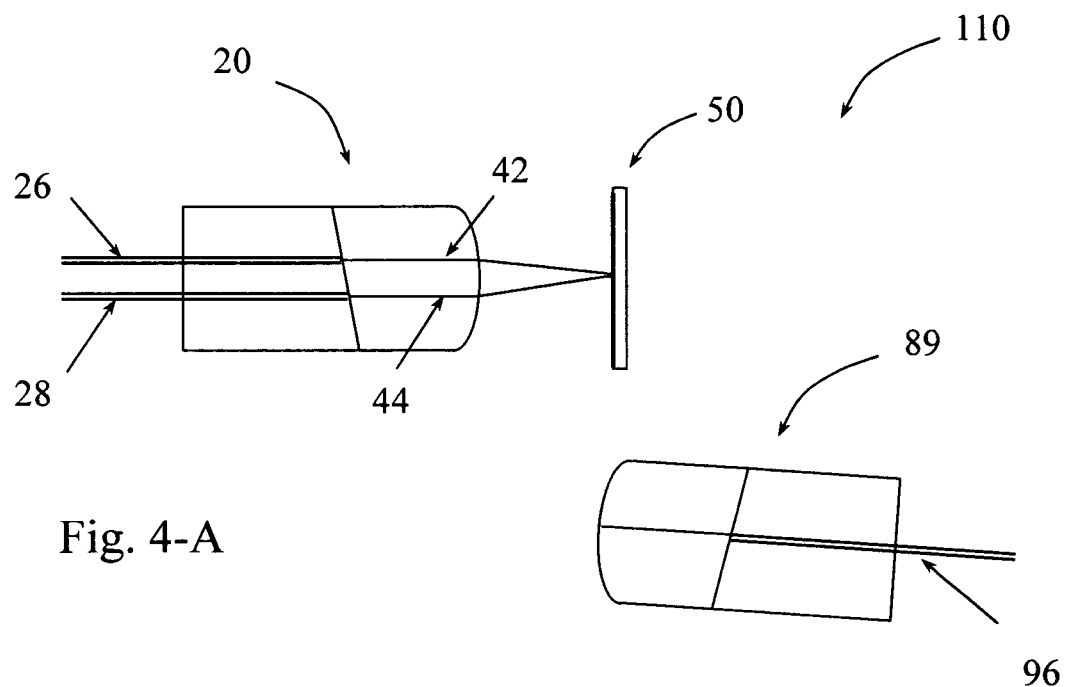
Fig. 4-A
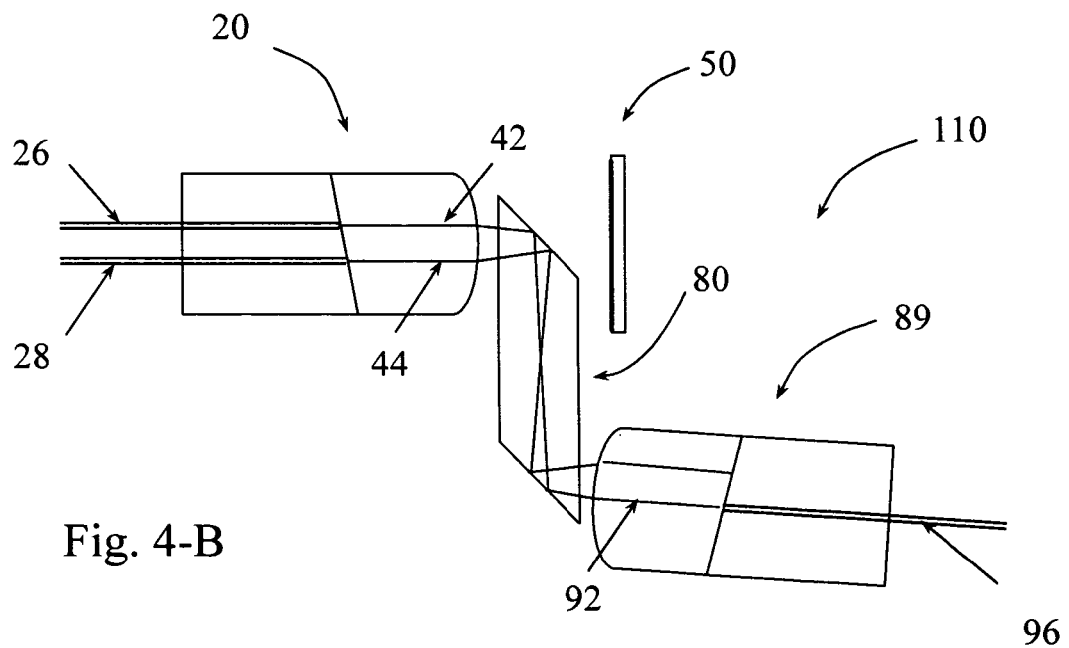
Fig. 4-B

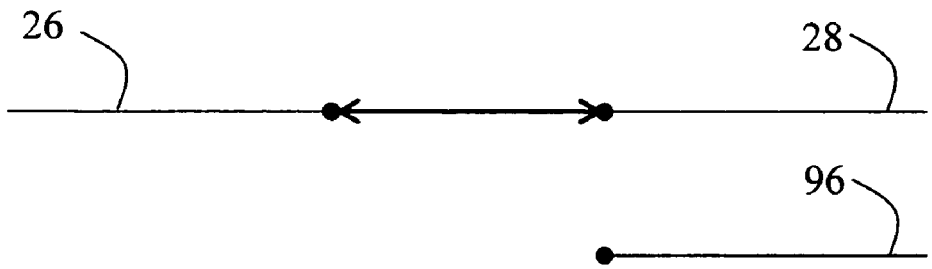
Fig. 5-A
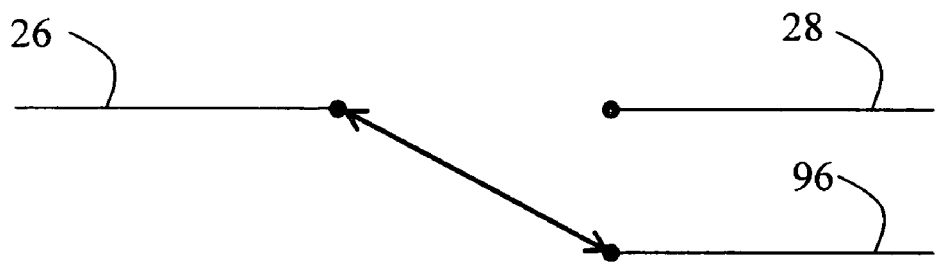
Fig. 5-B
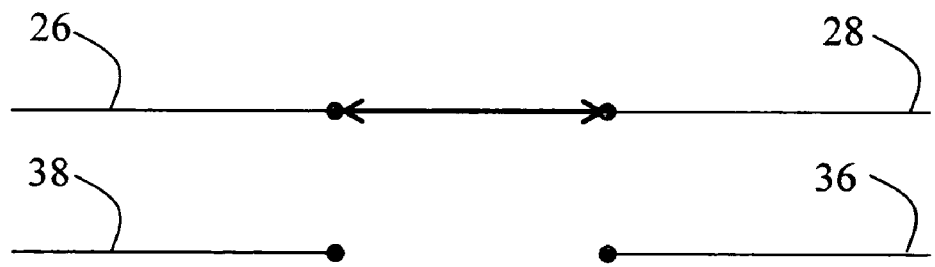
Fig. 7-A
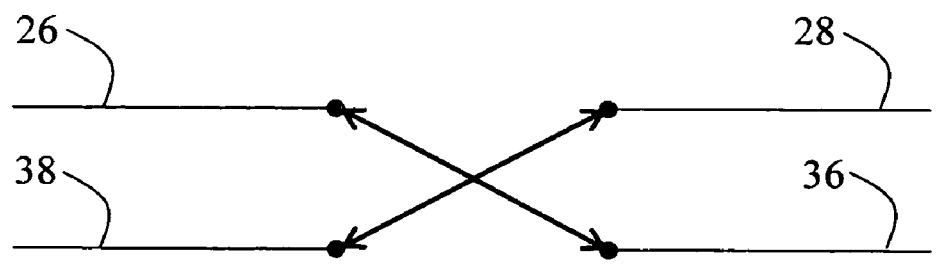
Fig. 7-B

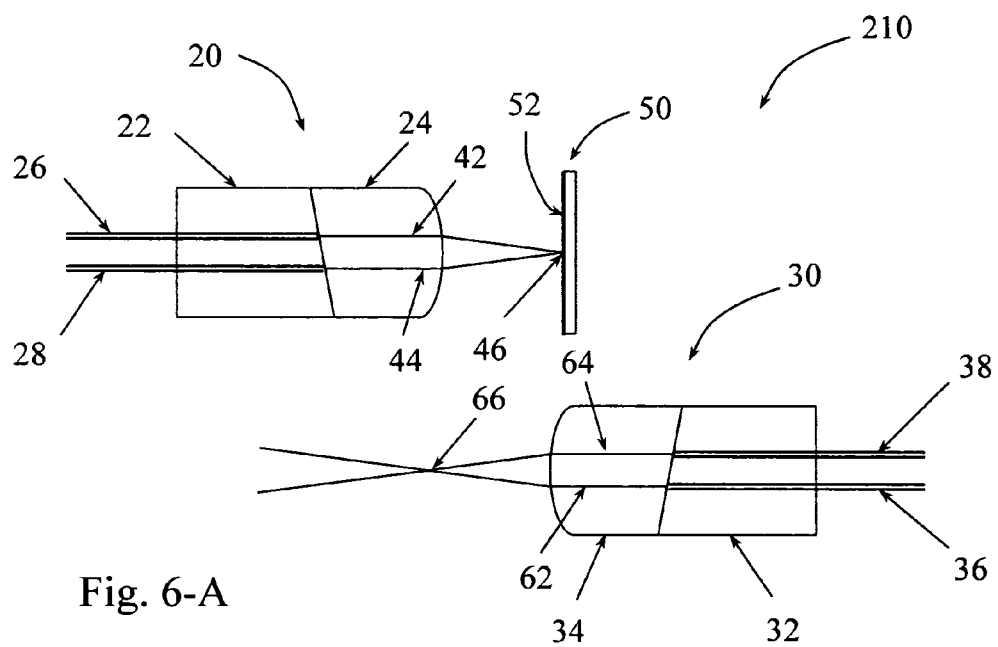
Fig. 6-A
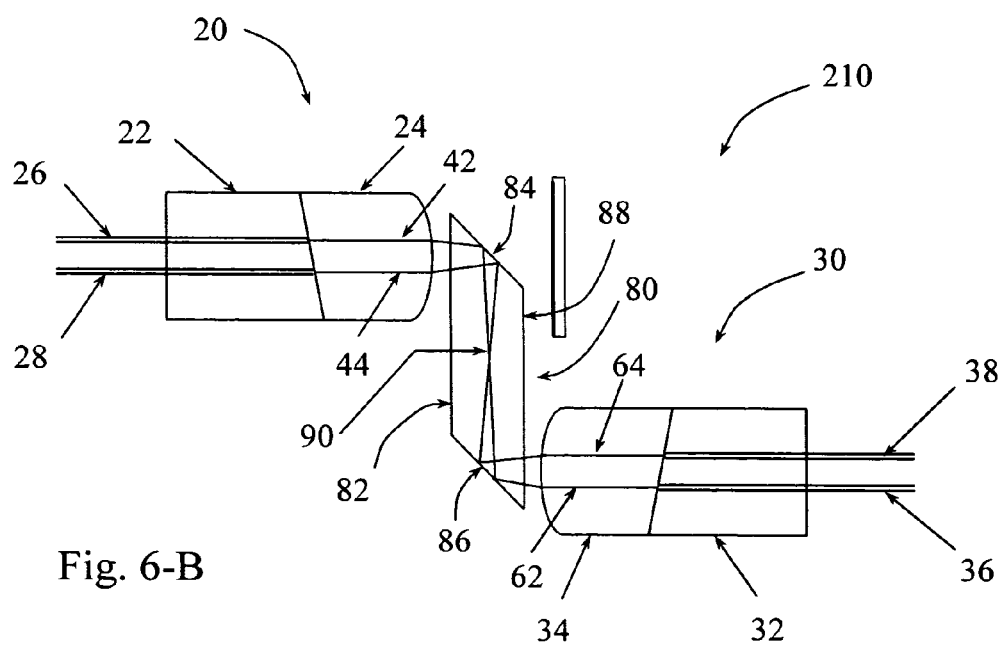
Fig. 6-B

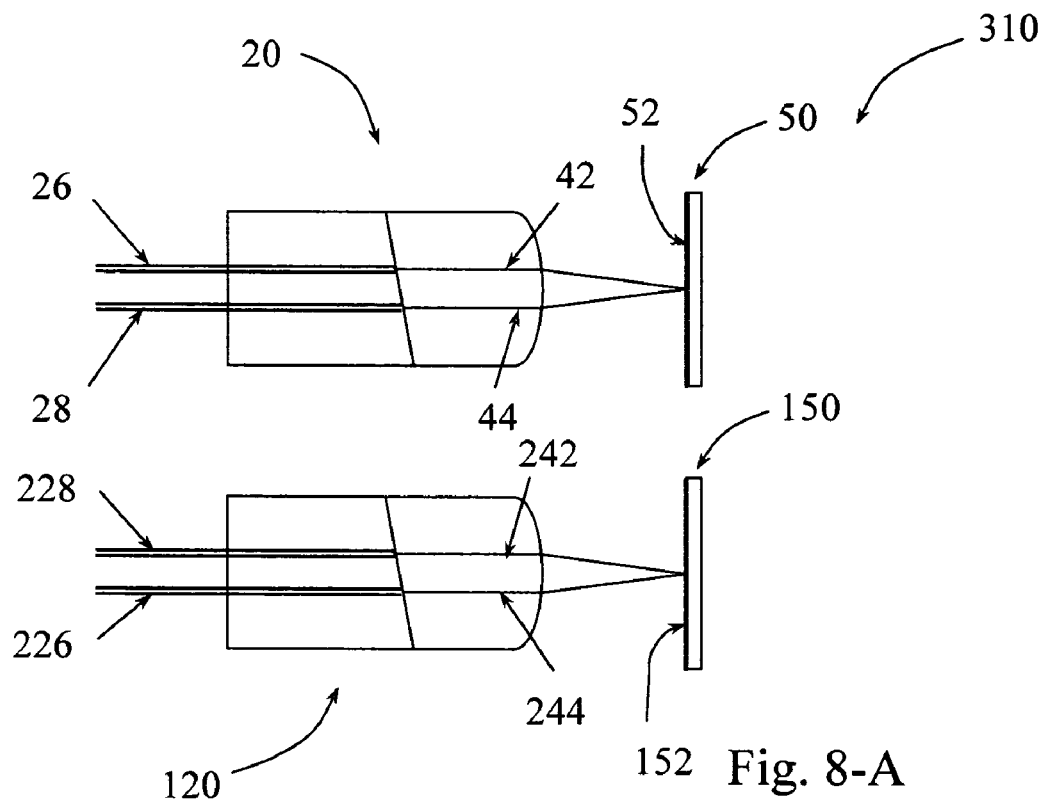
Fig. 8-A
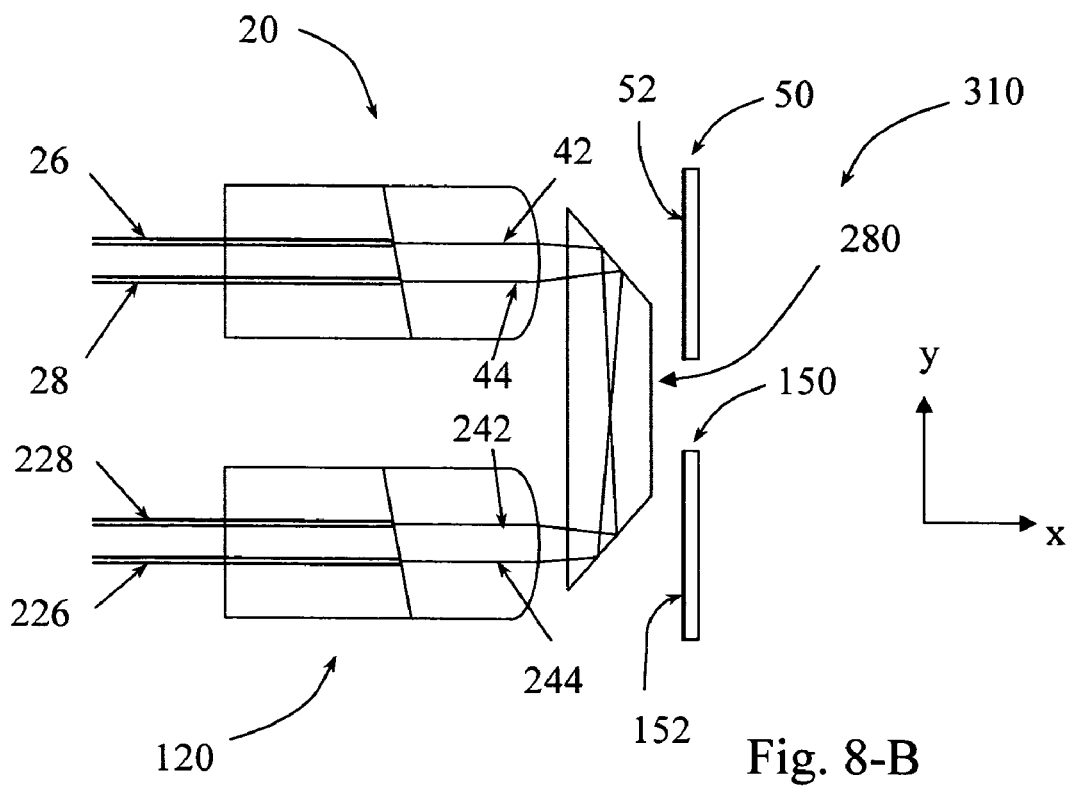
Fig. 8-B

COMPACT HIGH-STABILITY OPTICAL SWITCHES

FIELD OF THE INVENTION

The invention in general relates to fiber optic networks, and in particular to optical switches for fiber optic networks.

BACKGROUND

Optical switches are useful for a variety of applications, including fiber optic communications. In one design approach, optomechanical components are used to direct light from a desired optical input to a desired optical output. Conventional optomechanical switches include switches employing moving prisms and switches employing moving fibers, among others.

If insertion losses are to be maintained within an acceptable range, the various components of an optical switch ordinarily need to be precisely aligned relative to each other. Precise alignment requirements can significantly increase manufacturing costs, reduce manufacturing yields, and constrain the temperature ranges and vibration intensities to which the switches can be subjected.

SUMMARY OF THE INVENTION

According to one aspect, the present invention provides a 1×2 or 2×2 optical switch comprising: a first dual-fiber collimator comprising a first pair of optical fibers; a second fiber collimator comprising an output optical fiber; a switching prism movable between a first position and a second position, and a first mirror facing the first collimator. In the first position, the switching prism is positioned to direct light from an input fiber of the first collimator into the output fiber of the second collimator. In the second position, the switching prism is positioned out of an optical path of light emitted from the input fiber of the first collimator. The first mirror is aligned to reflect light from the input fiber of the first collimator into an output fiber of the first collimator when the switching prism is in the second position. In some embodiments, the second fiber collimator is a dual-fiber collimator, and a second mirror is placed facing the second fiber collimator, to reflect light from one of the fibers of the second fiber collimator into the other fiber of the second fiber collimator when the switching prism is in the second position.

According to another aspect, the present invention provides an optical switching method comprising: positioning a switching prism in a first position in an optical path between a first dual-fiber collimator comprising a first pair of optical fibers, and a second fiber collimator comprising an output optical fiber, employing the switching prism in the first position to direct light from an input fiber of the first collimator into the output fiber of the second collimator, positioning the switching prism in a second position out of an optical path of light emitted from the input fiber of the first collimator; and reflecting light emitted from the input fiber of the first collimator into an output fiber of the first collimator when the switching prism is in the second position.

BRIEF DESCRIPTION OF THE DRAWINGS

The foregoing aspects and advantages of the present invention will become better understood upon reading the following detailed description and upon reference to the drawings where:

FIGS. 1-A–B show a first switching configuration and a second switching configuration, respectively, of an optical switch according to an embodiment of the present invention.

FIGS. 2-A–B are schematic diagrams of optical paths through the switch of FIGS. 1-A–B for the two illustrated configurations, respectively, according to an embodiment of the present invention.

FIG. 3 illustrates several dimensions for the switch of FIGS. 1-A–B, according to an embodiment of the present invention.

FIGS. 4-A–B show a first switching configuration and a second switching configuration, respectively, of an optical switch according to another embodiment of the present invention.

FIGS. 5-A–B are schematic diagrams of optical paths through the switch of FIGS. 4-A–B for the two illustrated configurations, respectively, according to an embodiment of the present invention.

FIGS. 6-A–B show a first switching configuration and a second switching configuration, respectively, of an optical switch according to yet another embodiment of the present invention.

FIGS. 7-A–B are schematic diagrams of optical paths through the switch of FIGS. 6-A–B for the two illustrated configurations, respectively, according to an embodiment of the present invention.

FIGS. 8-A–B show a first switching configuration and a second switching configuration, respectively, of an optical switch according to still another embodiment of the present invention.

DETAILED DESCRIPTION OF THE INVENTION

In the following description, it is understood that any recitation of an element refers to at least one element. A set of elements includes one or more elements. A plurality of elements includes two or more elements.

FIGS. 1-A–B show two switching states, respectively, of a 2×2 optical switch 10, according to an embodiment of the present invention. Optical switch 10 includes a first input/output dual-fiber collimator 20 and a second input/output dual-fiber collimator 30. Each dual-fiber collimator 20, 30 includes an input optical fiber and an output optical fiber. Collimator 20 includes a dual-fiber pigtail 22, a securely attached microlens 24, and two optical fibers 26, 28. One of the fibers 26, 28 is an input fiber, while the other is an output fiber. Pigtail 22 holds the two optical fibers 26, 28 in general parallel positions. Collimator 30 includes a dual-fiber pigtail 32, an attached microlens 34, and two optical fibers 36, 38. One of the fibers 36, 38 is an input fiber, while the other is an output fiber. Collimators 20, 30 are oriented along generally parallel longitudinal axes, and face opposite directions. The longitudinal central axes of the two collimators 20, 30 are offset by a transverse extent which is preferably larger than the transverse diameter of each collimator. A first fixed mirror 50 having a planar reflective surface 52 is positioned facing collimator 20, and is aligned to reflect light emitted by one of the fibers 26, 28 into the other fiber 26, 28 when the switch is in the switching state shown in FIG. 1-A. Similarly, a fixed mirror 70 having a planar reflective surface 72 is positioned facing collimator 30, and is aligned to reflect light emitted by one of the fibers 36, 38 into the other fiber 36, 38 when the switch is in the switching state shown in FIG. 1-A.

If light is introduced into switch 10 through optical fiber 26, a divergent light beam emitted from the fiber end of optical fiber 26 is focused by microlens 24 and becomes a collimated light beam upon leaving collimator 20. The beam's central line is represented in FIGS. 1-A–B by a trajectory 42. Reciprocally, if a collimated light beam is incident on microlens 24 along trajectory 42 in the reverse direction, the light beam is transmitted through fiber 26. A trajectory 44 represents the central axis of a light beam corresponding to optical fiber 28. Trajectories 42, 44 intersect at a crosspoint 46 situated along mirror 50. A light beam incident along trajectory 42 is reflected by mirror 50 onto trajectory 44, and vice versa. The central lines of the light beams corresponding to the optical fibers 36, 38 of collimator 30 are illustrated as trajectories 62, 64, respectively. The two trajectories intersect at a crosspoint 66 situated along mirror 70. A light beam incident along trajectory 62 is reflected by mirror 70 onto trajectory 64, and vice versa.

FIG. 1-B illustrates a second switching state of optical switch 10. A movable rhomboid (parallelepiped-shaped) prism 80 is situated in a space bounded by collimators 20, 30 and mirrors 50, 70. In the in-plane cross-section shown in FIG. 1-B, prism 80 has a 45°-parallelogram shape. Prism 80 includes two parallel reflective surfaces 84, 86 oriented at about 45° with respect to two transmissive prism faces 82, 88 and the central longitudinal axes of collimators 20, 30. Transmissive prism faces 82, 88 are parallel, and situated on opposite sides of prism 80. Prism 80 is mechanically connected to a switching mechanism that moves prism 80 into and out of the space bounded by collimators 20, 30 and mirrors 50, 70. The switching mechanism may be an electromagnetic device such as an electric relay.

In the switch state shown in FIG. 1-B, light beams exiting collimators 20, 30 are intercepted by prism 80, and are not incident on mirrors 50, 70. A light beam emitted by optical fiber 26 along trajectory 42 enters prism 80 through transmissive face 82, is reflected by reflective surface 84, and travels in a generally-transverse direction within prism 80 until it is reflected by reflective surface 86. The general direction of light travel between reflective surfaces 84, 86 is transverse to the central axes of collimators 20, 30. The light beam exits prism 80 through transmissive face 88, and enters collimator 30 along trajectory 62. The light beam is focused by microlens 34 and collected by optical fiber 36. In the switching state shown in FIG. 1-B, prism 80 establishes an optical connection between optical fibers 26 and 36. A light beam emitted by optical fiber 36 travels in the opposite direction along the path described above, and is collected by optical fiber 26.

Similarly, a light beam emitted by optical fiber 28 along trajectory 44 enters prism 80 through transmissive face 82, is reflected by reflective surface 84, and travels in a generally-transverse direction within prism 80 until it is reflected by reflective surface 86. The light beam exists prism 80 through transmissive face 88, and enters collimator 30 along trajectory 64. The light beam is focused by microlens 34 and collected by optical fiber 38. The two light trajectories corresponding to optical fibers 26, 28 preferably intersect at a prism central point 90 situated within prism 80. The central point 90 is the center of prism 80. The angle between trajectories 42, 44 is identical to the angle between trajectories 62, 64.

FIGS. 2-A–B are schematic diagrams of optical paths through the switch of FIGS. 1-A–B for the two illustrated configurations, respectively, according to an embodiment of the present invention. In the switch configuration corresponding to FIGS. 1-A and 2-A, optical fiber 26 is optically connected to optical fiber 28, while optical fiber 36 is optically connected to optical fiber 38. In the switch configuration corresponding to FIGS. 1-B and 2-B, optical fiber 26 is optically connected to optical fiber 36, while optical fiber 28 is optically connected to optical fiber 38.

Preferably, the transmissive faces 82, 88 of prism 80 are anti-reflection (AR) coated. The reflective surfaces 84, 86 preferably have cleanliness and flatness characteristics of optical quality. The prism material is chosen according to its refractive index n. For total internal reflection inside a material of refractive index n, the incident angle $\theta$ with respect to the normal obeys the relation:

$$\sin \theta \geq 1/n. \qquad [1]$$

For BK7, a borosilicate optical glass, the refractive index is n=1.5, and the minimum angle $\theta$ given by Eq. [1] is 41.8°. Other glasses and optical materials may be used for prism 80.

FIG. 3 illustrates several dimensional parameters for optical switch 10. The distance $D_c$ from the endface of collimator 20 to mirror 50 is equal to the distance between the collimator endface and crosspoint 90. The distance between the endface of collimator 20 and the front transmissive surface of prism 80 is denoted by S. Preferably, the dimensions L, W of prism 80 are chosen according to the relation:

$$S+(L/2+W/2)/n=D_c \qquad [2]$$

where L is the length of prism 80, W is the width of prism 80, and n is the refractive index of the prism material. The width W is the size of prism 80 along the longitudinal axes of collimators 20, 30, while the length L is the size of prism 80 along a direction perpendicular to the longitudinal axes of collimators 20, 30. In an embodiment in which prism 80 is made of a block of BK7 borosilicate glass (n=1.5) of length L=5.5 mm, width W=2 mm, and in which collimators 20, 30 have cross point distances $D_c$=3 mm, eq. [2] yields a value S=0.5 mm for the separation between the collimator enfaces and prism 80.

If crosspoint 90 is to be situated in the center of prism 80, the distance between the end faces of collimators 20, 30 and the optical path crosspoint 90 may be constrained to be on the order of a few mm to cm. In one embodiment, collimators 20, 30 are dual-fiber C-lens collimators with an endface-to-crosspoint distance of about 3 mm. Conventional GRIN-lens collimators, by contrast, may have much lower endface-to-crosspoint distances. A switch employing such a collimator may require a prism of impractically-small size.

It was observed that the insertion losses between the two coupled dual-fiber collimators 20, 30 are relatively insensitive to variations in the separation distance between the two collimators. The sensitivity of the switch to separation distance variations is particularly small if the sum of the two collimator-to-prism distances is maintained at about 2S, i.e. if one distance is shorter and the other longer than S by approximately equal amounts. The relative insensitivity of insertion losses to placement distances allows relaxing the alignment tolerances which must be met during fabrication. A switch such as switch 10 is thus relatively easy to manufacture.

In one embodiment, to make switch 10, a pair of dual-fiber collimators 20, 30 is first selected, and the two collimators are inspected to verify that they have substantially identical crosspoint distances and crossing angles. Prism 80 may then be mounted within the switch housing, and positioned in the switching configuration of FIG. 1-B. Collimators 20, 30 are aligned to minimize insertion losses for light traveling through prism 80, and then affixed (e.g. by soldering) to the switch housing. Prism 80 is moved away from the switching position of FIG. 1-B, and mirrors 50, 70 are independently aligned relative to collimators 20, 30, respectively, so as to minimize insertion losses for light traveling between the two fibers of each collimator. In another embodiment, collimator 20 and mirror 50 are first aligned to minimize insertion losses between the two fibers of collimator 20, and are fixed in the aligned position. Prism 80 and collimator 30 are then aligned to minimize insertion losses between the two collimators 20, 30, and are fixed in the aligned position. Finally, mirror 70 is aligned with respect to collimator 30, to minimize insertion losses between the two fibers of collimator 30, and is fixed in the aligned position FIGS. 4-A–B show a first switching configuration and a second switching configuration, respectively, of a 1×2 optical switch 110 according to another embodiment of the present invention. FIGS. 5-A–B are schematic diagrams of the optical paths through the switch of FIGS. 4-A–B for the two illustrated configurations, respectively. Optical switch 110 differs from the 2×2 optical switch shown in FIGS. 1-A–B in that optical switch 110 includes a single-fiber collimator 89 instead of dual-fiber collimator 30. Optical switch 110 does not include a mirror facing single-fiber collimator 89. When prism 80 is retracted, light emitted by optical fiber 26 is directed to optical fiber 28 by mirror 50, as described above. When prism 80 is inserted, light emitted by optical fiber 26 is directed by prism 80 to optical fiber 96, as illustrated in FIG. 4-B by the beam trajectory 92.

FIGS. 6-A–B show a first switching configuration and a second switching configuration, respectively, of an add-drop optical switch 210 according to another embodiment of the present invention. FIGS. 7-A–B are schematic diagrams of the optical paths through the switch of FIGS. 6-A–B for the two illustrated configurations, respectively. Add-drop optical switch 210 differs from the 2×2 optical switch shown in FIGS. 1-A–B in that optical switch 210 does not include a mirror facing dual-fiber collimator 30, and thus optical fibers 36, 38 are not optically connected in any of the switch states. Fibers 36, 38 can be used for add or drop ports.

FIGS. 8-A–B show a first switching configuration and a second switching configuration, respectively, of a one-sided 2×2 optical switch 310 according to another embodiment of the present invention. Switch 310 includes two parallel, fixed dual-fiber collimators 20, 120, positioned side-by-side and facing in the same direction. Collimator 120 includes two optical fibers 226, 228 which exit the collimator assembly in the same direction as fibers 26, 28. A planar mirror 150 having a reflective surface 152 faces collimator 120. Mirror 150 may lie in the same plane as mirror 50. A movable dovetail (dove) prism 280 may be positioned with its transmissive front surface facing the two collimators 20, 120. In the in-plane view of FIGS. 8-A–B, dovetail prism 280 has a trapezoidal cross-section, with the trapeze base facing collimators 20, 120. Dovetail prism 280 is out of the optical path of switch 310 in FIG. 8-A, and in the optical path between collimators 20, 120 in FIG. 8-B. A one-sided dovetail prism configuration similar to the one shown in FIGS. 8-A–B may also be used in a 1×2 or add-drop optical switch as described with reference to FIGS. 4-A–B and 6-A–B.

The one-sided, dovetail-prism configuration shown in FIGS. 8-A–B may be more susceptible to tilting fluctuations about the y-axis (shown in FIG. 8-B) than the two-sided, rhomboid-prism configuration of FIGS. 1-A–B. To reduce such fluctuations, dovetail prism 280 may be mounted on a guide that restricts the prism's rotation about the y-axis. For example, dovetail prism 280 may be attached to an arm mounted on wobble-free bearings.

The preferred optical switching systems and methods described above allow generating output light beams that are relatively stable in response to thermal changes and vibrations to which the switch may be exposed. The use of a rhomboid prism in the geometry described above allows achieving output beam translational shifts and angle variations that are relatively insensitive to fluctuations in the position and orientation of the switching prism. For an ideal rhomboid prism, the output light beam remains parallel to the input beam as the prism translates or rotates around its central position, while the translational shift in the beam caused by prism tilt fluctuations is relatively small. The relative stability of the output beam's orientation is particularly advantageous because insertion losses caused by misalignment with the output collimator fiber are generally more sensitive to variations in beam orientation than to variations in beam translational shift. An output beam intensity repeatability on the order of 0.02 dB was observed in a prototype system configured as shown in FIGS. 1-A–B.

The use of dual-fiber collimators also allows a relatively compact and stable configuration for the optical switch. The two mirrors positioned facing the dual-fiber collimators provide enough alignment freedom so that all channels can be independently aligned to achieve minimal insertion losses. Insertion losses lower than 0.4 dB for all channels were readily achievable in a prototype system configured as shown in FIGS. 1-A–B. The alignment flexibility provided by the preferred design also allows relatively relaxed tolerances for the prism geometry, thus allowing a reduction in the prism cost without significantly affecting switching quality.

It will be clear to one skilled in the art that the above embodiments may be altered in many ways without departing from the scope of the invention. Accordingly, the scope of the invention should be determined by the following claims and their legal equivalents.

What is claimed is:
1. An optical switch comprising:
a first dual-fiber collimator comprising a first pair of optical fibers, the first pair of optical fibers including a first input fiber and a first output fiber;
a second dual-fiber collimator comprising a second pair of optical fibers, the second pair of optical fibers including a second input fiber and a second output fiber;
a switching prism movable between a first position and a second position, wherein:
in the first position, the switching prism is positioned to direct light from the first input fiber to the second output fiber, and direct light from the second input fiber to the first output fiber; and
in the second position, the switching prism is positioned out of an optical path of light emitted from the first input fiber and the second input fiber;
a first fixed planar mirror facing the first collimator separated from the switching prism, and aligned to reflect light from the first input fiber into the first output fiber when the switching prism is in the second position; and
a second fixed planar mirror facing the second collimator separated from the switching prism, and aligned to reflect light from the second input fiber into the second output fiber when the switching prism is in the second position.
2. The switch of claim 1, wherein:
the first collimator and the second collimator are substantially parallel and face opposite directions, and
the switching prism is parallelepiped-shaped.

3. The switch of claim 1, wherein:
the first collimator and the second collimator are substantially parallel and face a common direction; and
the switching prism is a dovetail prism.

4. The switch of claim 1, wherein:
the first mirror is positioned substantially a distance $D_c$ away from an endface of the first collimator; and
the switching prism is sized and positioned according to a relation $$S+(L/2+W/2)/n=D_c,$$

wherein S is a distance between the endface of the first collimator and a transmissive face of the switching prism, W is a width of the switching prism along a direction parallel to a longitudinal central axis of the first collimator, L is a length of the switching prism along a direction perpendicular to the longitudinal central axis of the first collimator, and n is an index of refraction of the switching prism.

5. An optical switching method comprising:
positioning a switching prism in a first position in an optical path between a first dual-fiber collimator comprising a first pair of optical fibers, and a second dual-fiber collimator comprising a second pair of optical fibers,
employing the switching prism in the fist position to direct light from an input fiber of the first collimator into an output fiber of the second collimator, and to direct light from an input fiber of the second collimator into an output fiber of the first collimator;
positioning the switching prism in a second position out of an optical path of light emitted from the input fiber of the first collimator and the input fiber of the second collimator;
reflecting light emitted from the input fiber of the first collimator into the output fiber of the first collimator when the switching prism is in the second position; and
using a fixed mirror to reflect separated from the switching prism light emitted from the input optical fiber of the second collimator into the output fiber of the second collimator when the switching prism is in the second position.

6. The method of claim 5, wherein:
the first collimator and the second collimator are substantially parallel and face opposite directions, and
the switching prism is parallelepiped-shaped.

7. The method of claim 5, wherein:
the first collimator and the second collimator are substantially parallel and face a common direction; and
the switching prism is a dovetail prism.

8. The method of claim 5, wherein:
the first mirror is positioned substantially a distance $D_c$ away from an endface of the first collimator; and
the switching prism is sized and positioned according to a relation $$S+(L/2+W/2)/n=D_c,$$

wherein S is a distance between the endface of the first collimator and a transmissive face of the switching prism, W is a width of the switching prism along a direction parallel to a longitudinal central axis of the first collimator, L is a length of the switching prism along a direction perpendicular to the longitudinal central axis of the first collimator, and n is an index of refraction of the switching prism.

9. An optical switch comprising:
a first dual-fiber collimator comprising a first pair of optical fibers;
a second fiber collimator comprising an output optical fiber;
a switching prism movable between a first position and a second position, wherein:
in the first position, the switching prism is positioned to direct light from an input fiber of the first collimator into the output fiber of the second collimator, and
in the second position, the switching prism is positioned out of an optical path of light emitted from the input fiber of the first collimator; and
a first fixed mirror facing the first collimator separated from the switching prism, and aligned to reflect light from the input fiber of the first collimator into an output fiber of the first collimator when the switching prism is in the second position.

10. The switch of claim 9, wherein:
the first collimator and the second collimator are substantially parallel and face opposite directions, and
the switching prism is parallelepiped-shaped.

11. The switch of claim 9, wherein:
the first collimator and the second collimator are substantially parallel and face a common direction; and
the switching prism is a dovetail prism.

12. The switch of claim 9, wherein the second collimator is a dual-fiber collimator including a second pair of optical fibers, the second pair of optical fibers including the output fiber of the second collimator.

13. The switch of claim 12, further comprising a second mirror facing the second collimator, and aligned to reflect light from an input fiber of the second collimator into the output fiber of the second collimator.

14. The switch of claim 9, wherein:
the first mirror is positioned substantially a distance $D_c$ away from an endface of the first collimator; and
the switching prism is sized and positioned according to a relation $$S+(L/2+W/2)/n=D_c,$$

wherein S is a distance between the endface of the first collimator and a transmissive face of the switching prism, W is a width of the switching prism along a direction parallel to a longitudinal central axis of the first collimator, L is a length of the switching prism along a direction perpendicular to the longitudinal central axis of the first collimator, and n is an index of refraction of the switching prism.

15. An optical switching method comprising:
positioning a switching prism in a first position in an optical path between a first dual-fiber collimator comprising a first pair of optical fibers, and a second fiber collimator comprising an output optical fiber,
employing the switching prism in the first position to direct light from an input fiber of the first collimator into the output fiber of the second collimator,
positioning the switching prism in a second position out of an optical path of light emitted from the input fiber of the first collimator; and
employing a fixed mirror separated from the switching prism to reflect light emitted from the input fiber of the first collimator into an output fiber of the first collimator when the switching prism is in the second position.

16. The method of claim 15, wherein:
the first collimator and the second collimator are substantially parallel and face opposite directions, and
the switching prism is parallelepiped-shaped.

17. The method of claim 15, wherein:
the first collimator and the second collimator are substantially parallel and face a common direction; and
the switching prism is a dovetail prism.

18. The method of claim 15, wherein the second collimator is a dual-fiber collimator including a second pair of optical fibers, the second pair of optical fibers including the output fiber of the second collimator.

19. The method of claim 18, further comprising reflecting light emitted from an input fiber of the second collimator into an output fiber of the first collimator when the switching prism is in the second position.

20. The method of claim 15, wherein:
the first mirror is positioned substantially a distance $D_c$ away from an endface of the first collimator; and
the switching prism is sized and positioned according to a relation $$S+(L/2+W/2)/n=D_c,$$

wherein S is a distance between the endface of the first collimator and a transmissive face of the switching prism, W is a width of the switching prism along a direction parallel to a longitudinal central axis of the first collimator, L is a length of the switching prism along a direction perpendicular to the longitudinal central axis of the first collimator, and n is an index of refraction of the switching prism.

* * * * *

UNITED STATES PATENT AND TRADEMARK OFFICE
CERTIFICATE OF CORRECTION

PATENT NO. : 6,970,615 B1
DATED : November 29, 2005
INVENTOR(S) : Fang et al.

It is certified that error appears in the above-identified patent and that said Letters Patent is hereby corrected as shown below:

Column 6,
Line 54, insert a comma -- , -- after "facing the first collimator";
Line 59, insert a comma -- , -- after "facing the second collimator".

Column 7,
Line 27, replace "fist" with -- first --;
Lines 39-40, replace "mirror to reflect separated from the switching prism light" with -- mirror separated from the switching prism to reflect light --.

Column 8,
Line 14, insert a comma -- , -- after "facing the first collimator".

Signed and Sealed this

Twenty-first Day of February, 2006

JON W. DUDAS
*Director of the United States Patent and Trademark Office*